UNITED STATES PATENT OFFICE.

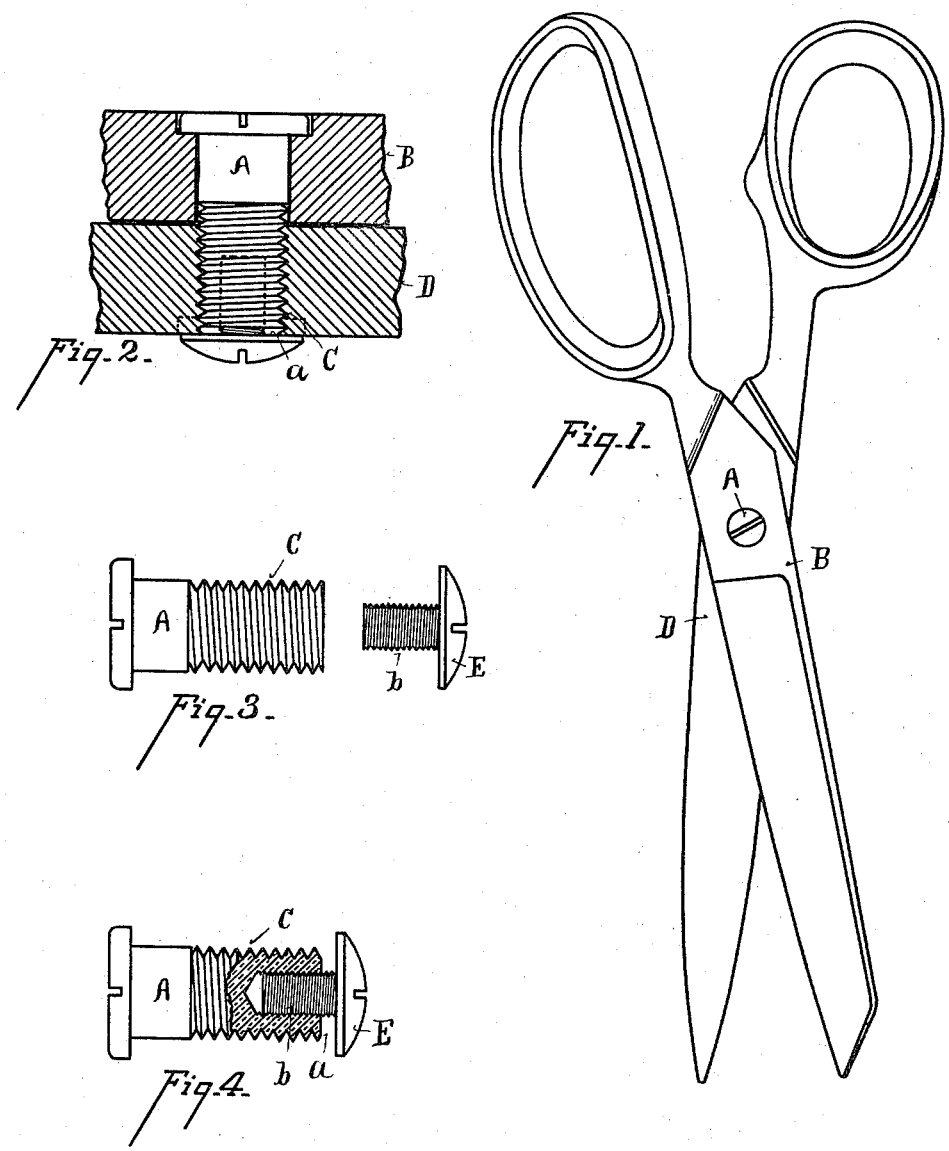

EDWARD W. SCALES, OF COVINGTON, KENTUCKY.

SHEARS-BOLT.

SPECIFICATION forming part of Letters Patent No. 586,067, dated July 6, 1897.

Application filed December 3, 1896. Serial No. 614,336. (No model.)

*To all whom it may concern:*

Be it known that I, EDWARD W. SCALES, residing at Covington, in the county of Kenton and State of Kentucky, have invented certain new and useful Improvements in Shears-Bolts, of which the following is a specification.

The object of my invention is to provide a screw pivot and fastening for the joining of the blades of scissors and shears, so constructed that only one blade is pivoted while the other is held fast by the threads of the fastening-bolt and the adjustment of the blades secured by a set-screw, the parts being so constructed that an accurate adjustment can be obtained at all times and all lost motion caused by the wear of the holding-heads of the pivot may be readily taken up. By the means herein shown and described the durability of the shears is greatly increased, at the same time an accurate adjustment of the blades can be easily obtained and the adjustment positively retained.

The features of my invention are more fully set forth in the description of the accompanying drawings, making a part of this specification, in which—

Figure 1 is a perspective view of a pair of shears embodying my improvement. Fig. 2 is a longitudinal section through the blades and screw-pivot. Fig. 3 is a plan view of the pivot-bolt and set-screw. Fig. 4 is a section showing these parts in position for holding the cutting-blades.

A represents the screw and pivot-bolt; B, one of the shear-blades, which journals on the pivot portion of the bolt.

C represents screw-threads formed on one end of the said bolt, and these threads engage with female threads formed in the blade D. In order to take up lost motion, care must be taken to have the bolt short enough, so that it will not tap clear through the blade D, leaving a recess $a$, as shown in Fig. 4.

E represents a set-screw which taps into a central bore in the pivot-bolt A, the threads $b$ on which are the reverse of the threads on the pivot-bolt. As the threads C of the pivot-bolt engage with the threads of the blade D the said blade is held stationary with reference to the pivot-bolt, and the shear-blade B oscillates thereon.

The head of the set-screw E bears against the blade D and prevents the pivot-bolt from turning and does not come in contact with the end of the pivot-bolt. The wear of the pivot by the use of the shears is chiefly on the head of bolt A and on the recess of the blade B. To take up this lost motion, it is only necessary to slacken the screw E and turn the screw A far enough to take up said lost motion, and then the set-screw E is turned back, so that its head engages against the blade D.

The head of screw E may be countersunk within the blade D, and this is the preferred form of construction, as shown by dotted lines, Fig. 2.

It will be observed that a portion of the threads of the bolt A are in the pivot-hole of blade B. This is necessary, or some equivalent method, in order to allow the bolt A to be turned up for lost motion as the shears wear. An equivalent method would be to recess the inner face of blade D, so that the barrel of bolt A could enter said recess; but as both blades are thin and it is designed to countersink the said set-screw within the blade D it would unduly weaken said blade in smaller sizes of shears and scissors.

By not projecting the pivot-bolt clear through the blade D two important advantages are obtained. First, in making the shears an accurate adjustment is obtained as soon as the head E is brought to engage against the blade D, and thus the length of the pivot is automatically obtained; second, wear is readily taken up by simply slackening the one screw, turning the pivot-bolt a little farther through the blade, and again tightening the set-screw. Again, this construction of the pivot-bolt and set-screw holds the parts absolutely in the adjusted position without any liability of loosening or coming off. This is very material, for the loosening of the shear-blades on their pivots, even in a minute degree, impairs the cutting quality of the shears.

Having described my invention, what I claim is—

1. In combination with shear-blades, a shear-bolt having a journal-bearing next the integral flanged head, a shear-blade journaling thereon, the other end of said bolt being screw-threaded, a second shear-blade having screw-threaded engagement with the end of said bolt, a screw-threaded bore in the end of the bolt and a screw-threaded set-nut tapping within said bore, the head of said set-nut bearing against the last-named shear-blade and locking it against rotary motion, substantially as specified.

2. In a pair of shears, the combination of a shear-bolt having a flanged head, a journal-space formed next to the flanged head, the end of the said bolt being screw-threaded and provided with a central bore internally screw-threaded, a shear-blade journaling on the bearing-surface of the bolt, the other blade having screw-threaded engagement with the end of said bolt, a set-nut tapping said central bore whereby the last-named blade is immovably secured to the said shear-bolt, substantially as specified.

In testimony whereof I have hereunto set my hand.

EDWARD W. SCALES.

Witnesses:
W. R. WOOD,
E. E. WOOD.